United States Patent
Karpy (10) Patent No.: US 7,114,615 B1
(45) Date of Patent: Oct. 3, 2006

(54) WEB BRACKET FOR AN OPEN FRAME CONVEYOR

(75) Inventor: Daniel P. Karpy, Odesa, FL (US)

(73) Assignees: Roger Kumar, Tampa, FL (US); Lila Kumar, Tampa, FL (US)

( * ) Notice: Subject to any disclaimer, the term of this patent is extended or adjusted under 35 U.S.C. 154(b) by 0 days.

(21) Appl. No.: 11/111,000

(22) Filed: Apr. 20, 2005

(51) Int. Cl.
*B65G 21/08* (2006.01)

(52) U.S. Cl. .................. 198/860.1; 198/841

(58) Field of Classification Search .......... 198/841, 198/837, 860.1, 861.1
See application file for complete search history.

(56) References Cited

U.S. PATENT DOCUMENTS

| | | | | |
|---|---|---|---|---|
| 3,796,503 A | * | 3/1974 | Dawson | ........... 198/860.1 |
| 5,310,047 A | * | 5/1994 | Ledingham | ........... 198/841 |
| 5,421,451 A | | 6/1995 | Easton | |
| 6,170,649 B1 | | 1/2001 | Radandt et al. | |
| 6,296,111 B1 | * | 10/2001 | Mekanik et al. | ......... 198/860.1 |
| 6,591,979 B1 | | 7/2003 | Karpy | |
| 6,871,737 B1 | * | 3/2005 | Ertel et al. | ........... 198/860.1 |

* cited by examiner

*Primary Examiner*—James R. Bidwell
(74) *Attorney, Agent, or Firm*—Howard L. Hoffenberg, Esq.; Law Offices of Howard L. Hoffenberg, Esq.

(57) ABSTRACT

This patent teaches and claims web brackets for open frame continuous conveyor systems and open frame continuous conveyor systems utilizing these web brackets. An exemplary web bracket is comprised of a plate; a side grip slot defining an opening within the interior area that extends from the peripheral edge which is shaped to have a pair of oppositely opposed skid rail grip tips, a wash out gap and a skid rail base and is adapted to friction fit a skid rail and a perimeter defining an opening for receiving a frame rail within the interior area.

21 Claims, 6 Drawing Sheets

WEB BRACKET FOR AN OPEN FRAME CONVEYOR

BACKGROUND OF THE INVENTION

1. Field of the Invention

This invention pertains generally to conveyor frames and more particularly, to web brackets for open frame continuous conveyor systems.

2. Related Art

A Continuous Conveyor System (CCS) is a mechanism for transporting articles from one location to another. In a common CCS, there is a belt in an elongated loop configuration where a top portion of the belt loop is above a bottom portion of the belt loop. The belt is driven round and round by a motor. An article is placed on the belt and is held in place on the belt by gravity. As the belt moves, the article rides along the belt from a first point to another point.

The CCS may include legs to support the conveyor belt a distance above the ground/floor. The System may include guide rails to retain articles on the conveyor belt.

Continuous Conveyor Systems are used in the food and pharmaceutical industries. During operation, small pieces of meat, powders and/or other debris collect on or within the Continuous Conveyor System. Accordingly, the CCS requires routine cleaning which is labor intensive and/or not effective to sanitize the CCS. The cleaning CCS is made difficult by debris collecting within casings, in lap seams between components and/or in the interstitial spaces around penetrating fasteners.

An improved CCS is an Open Frame Continuous Conveyor System ("OFCCS") as described in U.S. Pat. No. 6,591,979 issued to Applicant, Daniel P. Karpy, on Jul. 15, 2003 and incorporated herein by reference. An OFCCS is easier to clean than a common CCS.

In an OFCCS there is a Frame Rail (also called an Elongated Conveyor Support) that is like a horizontal spinal cord. When the OFCSS is fully assembled, the Frame Rail is located between the top and bottom portions of the endless conveyor loop and is approximately the length of the loop.

There are Web Brackets (also called Frame Members) mounted to the Frame Rail in a perpendicular fashion and spaced apart along the Frame Rail. When the OFCSS is fully assembled, the Web Brackets are located between the top and bottom portions of the continuous conveyor loop. The Web Bracket is of a sufficient length that its distal edges extends beyond the width conveyor belt.

At each of the distal ends of a Web Bracket, there is an arm in the plane of the bracket that further extends outward. Formed at the end of the arm is a right angle bend. This results in a Skid Rail Tab (also called a leg.) The Skid Rail Tab is for the attachment of a Skid Rail (also called a Track Guide or Wearstrip.)

A Skid Rail is an elongated strip on which the conveyor belt slides. The Skid Rail has a wide width and a short height and is said to be lying on Flat. The Skid Rail is attached to the Skid Rail Tab through a connector aperture in the Skid Rail Tab, an aperture in the Skid Rail and a fastener such as a bolt and nut.

As mentioned, the conveyor belt slides along the Skid Rail and there is abrasion of the surface of the Skid Rail. The short height of the Skid Rail becomes the limiting dimension for the life of the Skid Rail. That is, the short height defines an abrasion zone. A Skid Rail lying on flat provides strength for supporting articles on the conveyor belt; but, it does not provide great strength.

Typically, at the distal of the Web Bracket, there are additional arms for the attachment of support legs and guide rails.

In a typical application of OFCCS in the food and pharmaceutical industries there is a daily routine in which the OFCCS is run for 1 to 2 eight hour shifts and one eight hour sanitizing shift (usually at night.) During this sanitizing shift the conveyor is sanitized by in-place cleaning, followed by partial disassembly, followed by an out-of-place cleaning of some components and then re-assembly.

In more detail, the cleaning shift is begun with "clean in place" (CIP) cleaning to attempt to remove solids and visible dirt. A CIP cleaning is begun by foaming of the conveyor frame with a caustic foam to disinfect. This is followed by a hot water rinse. The CIP cleaning can leave behind solids in the lap seam between a Skid Rail and the Skid Rail Tab and in the interstitial spaces of penetrating fasteners. There can be thermal expansion of the Skid Rail with concomitant bowing of the Skid Rails between attachment points at successive Web Brackets. This in turn results in an uneven carrying surface for the belt which in turn causes articles to shift as they ride on the belt and higher wear of the Skid Rail.

The CIP is followed by a "clean off place/premises" (COP) cleaning of some components. This COP cleaning can be somewhat laborious. More precisely, there is a disassembly of the Skid Rails from the Web Brackets. This disassembly requires the use of tools to remove the penetrating fasteners that attach the Skid Rails to the Skid Rail Tabs of the Web Bracket. The Skid Rails and other removed components are put in a tank for a washing cycle. This is followed by re-assembly. As with disassembly, reassembly requires the use of tools and is somewhat laborious.

There is a need for an improved OFCCS which does not require tools for disassembly of Skid Rails for a COP cleaning.

There is a need for an improved OFCCS with Skid Rails that have enhanced mechanical strength compared to that in current OFCCS.

There is a need for an improved OFCCS with Skid Rails that wear longer compared to that in current OFCCS.

There is a need for an improved OFCCS that has web brackets that provides the utility of securing Skid Rails that is less expensive and easier to manufacture.

There is a need for an improved OFCCS that has web brackets that are stronger and more resistant to longitudinal bending There is a need for an improved OFCCS that reduces or eliminates heat deflection of Skid Rails during CIP.

There is a need for an improved OFCCS that reduces or eliminates solids remaining in lap seams and the interstitial spaces of penetrating fasteners after CIP.

The present invention satisfies these needs, as well as others, and generally overcomes the presently known deficiencies in the art.

SUMMARY OF THE INVENTION

The present invention is directed to web brackets for open frame continuous conveyor systems (OFCCS) and to open frame continuous conveyor systems utilizing these web brackets.

An objective of the present invention is an OFCCS which does not require tools for disassembly of Skid Rails for a COP cleaning.

An object of the present invention is an OFCCS with Skid Rails that have enhanced mechanical strength compared to that in current OFCCS.

An objective of the present invention is an OFCCS with Skid Rails that wear longer compared to that in current OFCCS.

An objective of the present invention is a web bracket that provides the utility of securing Skid Rails that is less expensive and easier to manufacture compared to current OFCCS.

An objective of the present invention is a web bracket that is stronger and more resistant to longitudinal bending An objective of the present invention is an OFCCS that reduces or eliminates heat deflection of Skid Rails during CIP.

An object of the present invention is an OFCCS that reduces or eliminates solids remaining in lap seams and the interstitial spaces of penetrating fasteners after CIP.

One aspect of the present invention is an end web bracket for use in an open frame continuous conveyor system. The end web bracket is comprised of a plate having an interior area and a peripheral edge. The plate has a side grip slot defining an opening within the interior area that extends from the peripheral edge which is shaped to have a pair of oppositely opposed skid rail grip tips, a wash out gap and a skid rail base and is adapted to frictionally fit a skid rail.

Another aspect of the present invention is a middle web bracket for use in an open frame continuous conveyor system. The middle web bracket is comprised of comprised a plate having an interior area and a peripheral edge. The plate has a side grip slot defining an opening within the interior area that extends from the peripheral edge which is shaped to have a pair of oppositely opposed skid rail grip tips, a wash out gap and a skid rail base and is adapted to friction fit a skid rail. The plate also has a perimeter defining an opening for receiving a frame rail within the interior area.

Another aspect of the present invention is an open frame continuous conveyor system comprised of a frame rail having an interior length and ends. Onto this frame rail there are a plurality of web brackets (as described above) mounted along the frame rail in spaced apart relation. A skid rail mounted lying on edge is in the side grip slots of web brackets. A continuous conveyor belt is running parallel over the skid rail. There is a drive which is in mechanical connection to the conveyor belt which locomotes the conveyor belt along the skid rail.

The previously described versions of the present invention has many advantages which include lower manufacturing costs and the utilization of less material; lower operating and maintenance costs and enhance performance.

BRIEF DESCRIPTION OF THE DRAWINGS

These and other features, aspects and advantages of the present invention will become better understood with reference to the following description, appended claims and accompanying drawings where:

DETAILED DESCRIPTION OF THE INVENTION

Figure 1:
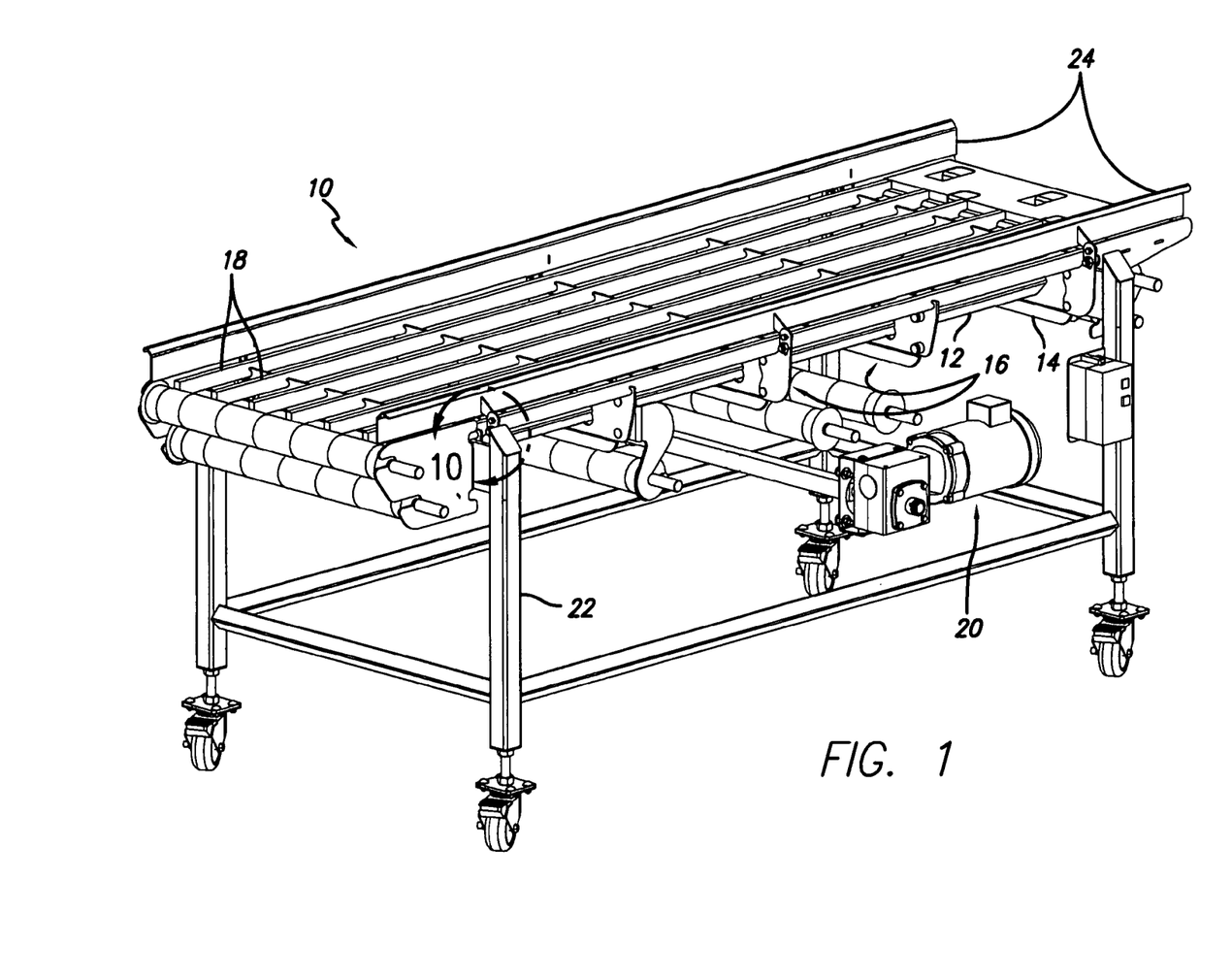
FIG. 1 is a perspective view illustrating an Open Frame Continuous Conveyor System (OFCCS) according to the present invention.

Referring to FIG. 1, an Open Frame Continuous Conveyor System (OFCCS) 10 is comprised of one or more Frame Rails 12 (barely visible in the figure); one or more End Web Brackets 14 (which are mounted on the Frame Rails); one or more Middle Web Brackets 16 (which are mounted on the Frame Rails); a continuous conveyor belt (not illustrated) which slides over one or more Skid Rails 18 and a Drive 20 that provides locomotion to the conveyor belt. Typically, there are support legs 22 and guide rails 24. As the conveyor belt slides over the Skid Rails 18 there is friction and abrasion. Skid Rails 18 are sometimes referred to as Wearstrips.

Figure 2:
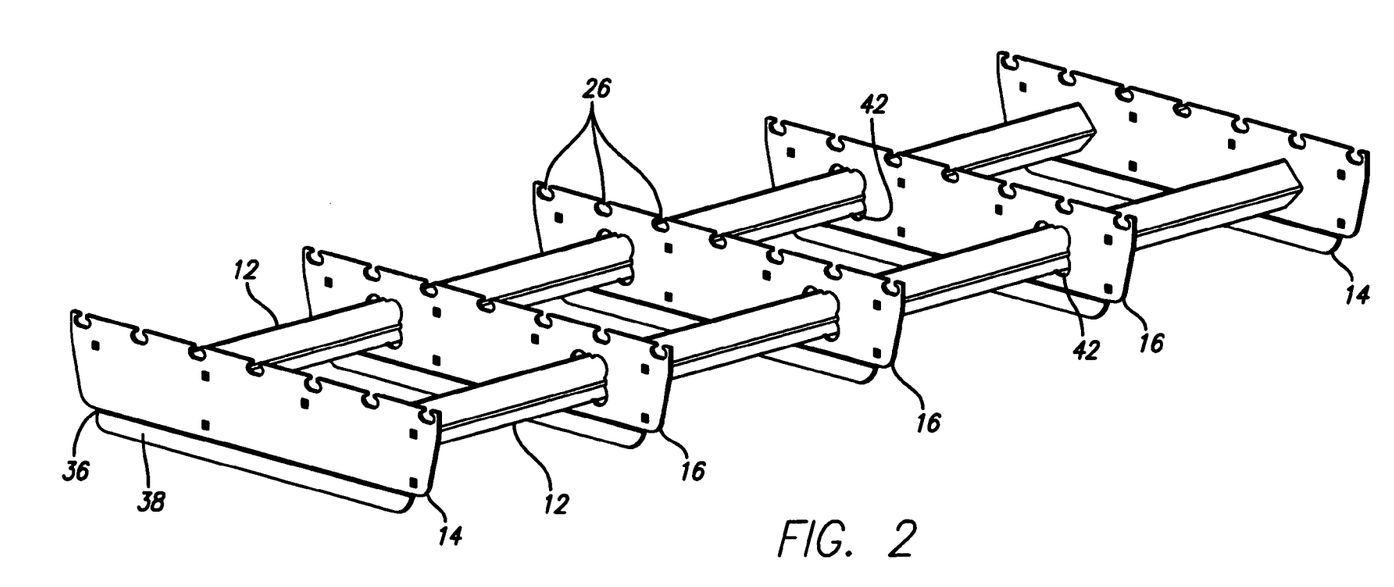
FIG. 2 is a perspective view illustrating a plurality of Frame Rails with Middle Web Brackets mounted in spaced apart fashion along the Frame Rails and End Web Brackets mounted at the Ends of the Frame Rails.

Referring to FIG. 2, a Frame Rail 12 is an elongated support for the conveyor having Length and Ends. In colloquial terms, the Frame Rail 12 can be conceptualized as a backbone. The Frame Rail 12 can be either solid or hollow with hollow being preferred because of material and weight savings. The Frame Rail 12 has a cross-sectional shape and dimensions which provides suitable strength to support the conveyor with articles disposed on it and takes into consideration the cost of material, weight and durability. Typically, the cross-sectional shape of the Frame Rail 12 defines a square or circle with a square being most preferred.

The Frame Rail 12 is made out of out a material that provides suitable durability and strength such as metal or plastic. A preferred material is Stainless Steel (SS) and a most preferred material is SS304 or SS316. Carbon steal and aluminum should be avoided. Carbon steal is avoided because of its lack of cleanliness and legal prohibitions against its use in sanitary conveyor. Aluminum should be avoided because of its reactivity with the caustic foam used in cleaning. A most preferred Frame Rail 12 is a hollow two inch square of 11 gauge SS 304 or 306.

Referring to FIG. 2, onto the Frame Rail(s) 12 there is mounted one or more End Web Brackets 14 and/or Middle Web Brackets 16. These Web Brackets 14,16 are discussed more thoroughly herein and are mentioned at this time for the purpose of introducing a discussion on Skid Rails 18.

Figure 9:
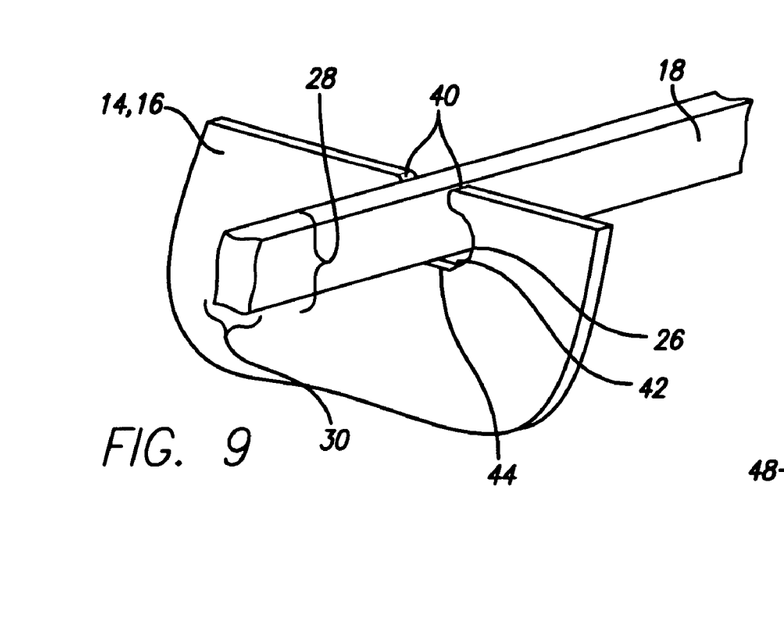
FIG. 9 is a perspective view illustrating a Skid Rail on edge which is frictionally fitted into the Side Grip Slot of a Web Bracket according to the present invention and FIG. 10 is a blow-up perspective view illustrating Accessory Holes being used for securing a Guide Rail bracket system and Guide Rail according to the present invention.

Referring to FIGS. 1 and 9, inserted into the Web Bracket(s) 14, 16 are one or more Skid Rails 18. A Skid Rail 18 is an elongated beam having at least one smooth surface which slidingly receives a continuous conveyor belt thereon in operative relation. The Skid Rail 18 can be either solid or hollow with solid being preferred because of strength, durability and ease of manufacture. The Skid Rail 18 has a cross-sectional shape and dimensions which are suitable for being frictionally inserted into a Side Grip Slot 26 (discussed below) of a Web Bracket 14, 16 and for supporting the conveyor belt with consideration for the cost of material, weight and durability. Referring to FIG. 9, typically, the cross section is a rectangle having a short side 28 and long side 30.

The Skid Rail 18 is made out of a material that provides suitable durability and strength to perform the aforementioned such as plastics or stainless steal. A preferred material is ultrahigh molecular weight plastic. A more preferred material is antimicrobial UHMW plastic based on silver ions. A highly preferred Skid Rail 18 is made from antimicrobial UHMW plastic having a ⅝ inch by 1¼ inch rectangular cross-section. Another highly preferred Skid Rail 18 is made from antimicrobial UHMW plastic having a ⅝ inch by 1⅜ inch rectangular cross-section.

Figures 3, 4, 5:
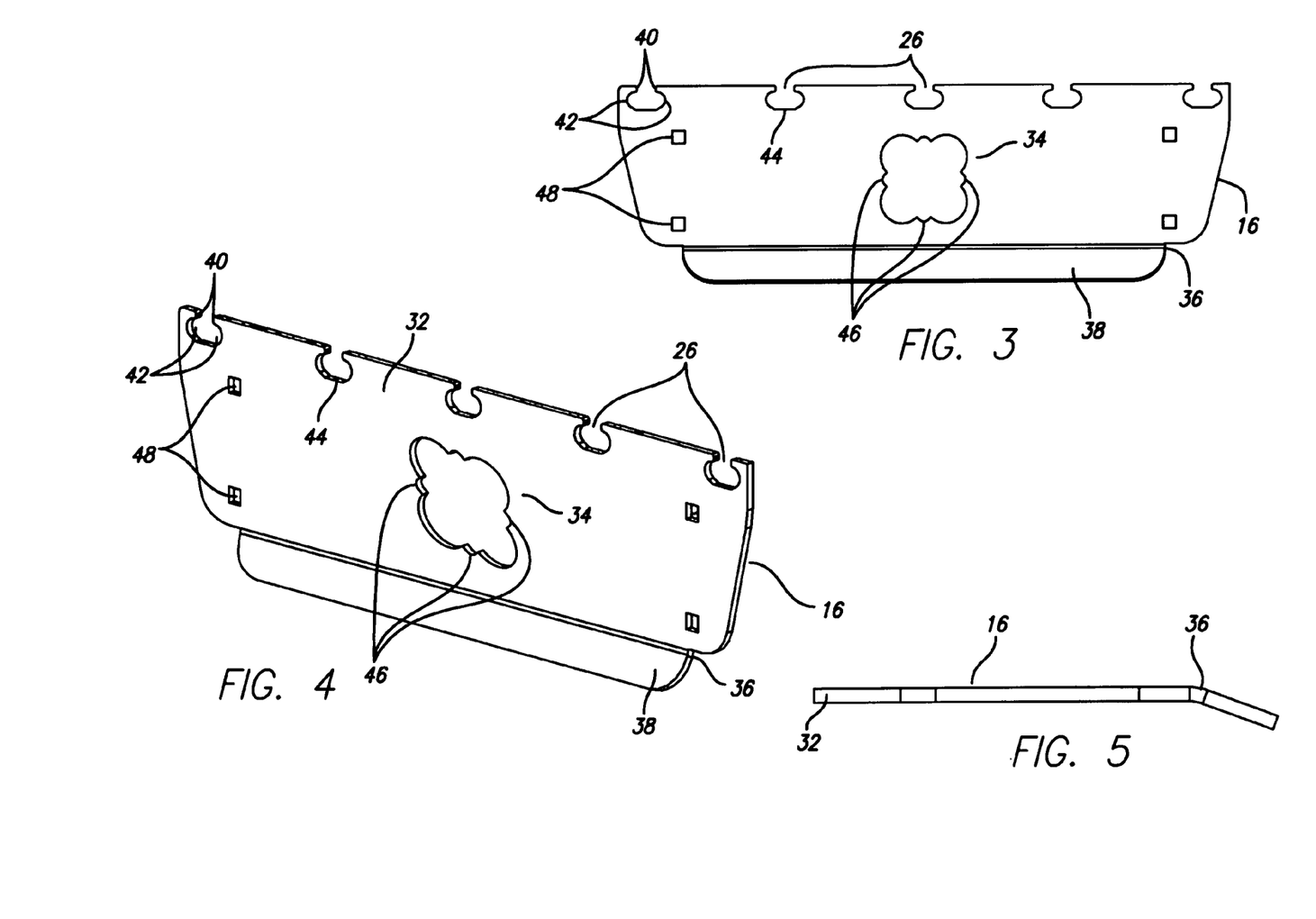
FIG. 3 is a front plan view illustrating a Middle Web Bracket according to the present invention.
FIG. 4 is a perspective view illustrating a Middle Web Bracket according to the present invention.
FIG. 5 is a side plan view illustrating a Middle Web Bracket according to the present invention.

Referring to FIG. 3 and FIG. 4, a Middle Web Bracket 16 is comprised of a Plate 32; at least one Side Grip Slot 26 (discussed below) and at least one Perimeter Defining An Opening For Receiving A Frame Rail 34 (discussed below.) The Plate 32 is a wholly separate modular piece. The Plate 32 has a Peripheral Edge and Interior Area. The Plate 32 is usually flat or planar (except for the addition of a Stiffener Bend 36 (explained below); however, it can be non-flat and/or have morphologies to an extent consistent with performing the functions specified herein.

The Plate 32 is typically formed from an extruded or molded material with sufficient rigidity for the application specified herein such as metal or plastic. A preferred material is gauge 7 Stainless Steel 304 or 306. As mentioned above, carbon steel and aluminum should be avoided based on considerations of cleanliness, legal requirements and reactivity to caustic foam. The overall shape of the plate and the features described herein are formed by stamping, machining (e.g., drilling, cutting, routing and the like) and/or laser cutting. Laser cutting is a preferred method.

The overall shape of the Plate 32 is usually substantially rectangular; however other shapes can be utilized which are of suitable geometry for performing the functions specified herein. Optionally, the Plate 32 can have rounded corners and/or slightly tapered sides. Also, optionally, the Plate 32 can have lip 38 of slightly lesser length than the length of the Plate 32 for use in connection with a Stiffener Bend 36 (explained below) and optionally, the corners of the lip 38 can be rounded. The thickness of the plate is such to provide suitable strength to support the conveyor with articles disposed on it and Accessories (explained below) and takes into consideration cost, weight and durability. A preferred outside dimensions for the plate is 14.56 inches by 6.20 inches for use in conveyor system having a 14 inch wide belt.

Referring to FIG. 4 and FIG. 9, the Side Grip Slot 26 defines a recess extending from the Peripheral Edge into the Interior Area of the Plate 32 which is shaped to have a pair of oppositely opposed Skid Rail Grip Tips 40 (discussed below), a Wash Out Gap 42 (discussed below) and a Skid Rail Base 44 (discussed below) and is adapted to friction fit a Skid Rail 18. From the perspective of the Web Bracket 16 being mounted on the Frame Rail 12, the Side Grip Slot 26 is located along the superior portion of the Peripheral Edge of the Plate 32.

Referring to FIG. 1 and FIG. 2, there is at least one, and preferably, five to eight, Side Grip Slots 26 along the superior portion of the Peripheral Edge of the Plate 32. The Side Grip Slots 26 are positioned at substantially the same points on each of the Middle Web Brackets 16 that will be assembled into an OFCCS 10 (see discussion below.) Thus, in an assembled OFCCS 10 (see discussion below), the Side Grip Slots 26 form rows/columns amongst in going along successive Middle Web Brackets 16 so as to facilitate insertion of a Skid Rail 18 into these rows/columns of Side Grip Slots 26.

Referring to FIG. 4 and FIG. 9, the Skid Rail Grip Tip 40 is a protrusion or feature that forms a contact surface for a the lateral side of a Skid Rail 18. Preferably, the Skid Grip Tip 40 has a rounded configuration. It can be as simple as linear; however, this is not preferred. A Skid Rail Grip Tip 40 is paired with an oppositely opposed Skid Rail Grip Tip 40. The pair of Skid Rail Grips 40 are spaced a distance apart such that a Skid Rail is frictionally inserted there between. The friction fit is such that the Skid Rail 18 can be inserted and removed without significant force or damage to the Skid Rail 18 and such that the Skid Rail 18 is held in place under normal stresses and strains of installation and operation of the conveyor, taking into account the cumulative friction force of a single Skid Rail 18 being inserted into the Side Grip Slots 26 of successive Middle Web Brackets 16.

Continuing to refer FIG. 4 and FIG. 9, the Wash Out Gap 42 is a recess arch such that when a Skid Rail 18 is inserted into the Slide Grip Slot 26 there is gap between the lateral surface of the Skid Rail 18 and the Plate 32. As the name implies, a Wash Out Gap 42 improves washability. Preferably, the Side Grip Slot 26 is shaped to have a pair oppositely opposed Wash Out Gaps 42.

The Skid Rail Base 44 is a feature that forms a contact surface for a the inferior side of a Skid Rail 18. That is, it is a surface for supporting the Skid Rail 18. Typically, the Skid Rail Base 44 is linear; however it be of other shape.

Figure 6:
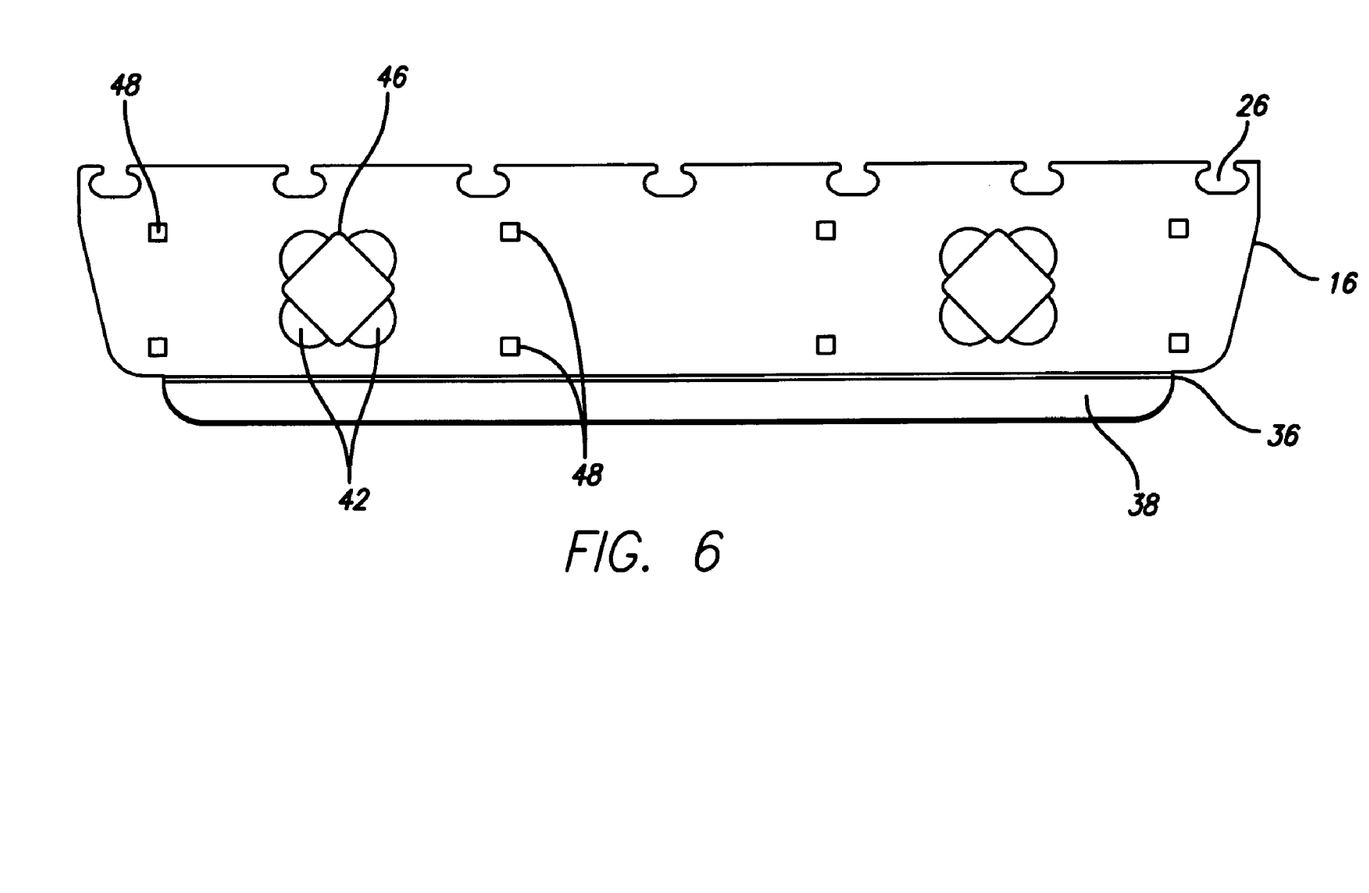
FIG. 6 is a front schematic view illustrating a Middle Web Bracket according to the present invention where a Frame Rail is seated at Relief Welds within the Perimeter Defining An Opening For Receiving A Frame Rail.

Referring to FIG. 3, FIG. 4 and FIG. 6, the Perimeter Defining An Opening For Receiving A Frame Rail 34 is an aperture through the Middle Web Bracket 16 to receive a Frame Rail in surrounding, supporting relation. As with the Side Grip Slot 26, it is formed by stamping, machining and/or laser cutting. Laser cutting is a preferable way of forming the Perimeter. Preferably, the Perimeter Defining An Opening For Receiving A Frame Rail 34 is formed at the same time as other features on or of the Plate 32 are formed, so as to reduce manufacturing costs.

Referring to FIG. 3 and FIG. 4, the Perimeter Defining An Opening For A Frame Rail 34 is preferably shaped to have Relief Welds 46. Relief Welds 46 are arches in the Perimeter that receive a contact point on the Frame Rail 12. Referring to FIG. 6, with a Frame Rail 12 that has a square cross-section, preferably there are four orthogonal Relief Welds 46 in the Perimeter Defining An Opening For A Frame Rail 34. The four corners of a cross-section of the square Frame Rail 12 position into in to the Relief Welds 46. Thus, the Relief Welds 46 form a jig for the Frame Rail 12 and add to the ease of assembly. The Relief Welds 46 minimize heat distortion (thermal expansion) of the Frame Rail 12 during assembly welding and enhance mechanical strength.

Continuing to refer to FIG. 4 and FIG. 6, the Perimeter Defining An Opening For A Frame Rail 34 is preferably shaped to have Wash Out Gaps 42. A Wash Out Gap 42 is an arch in the Perimeter Defining An Opening For A Frame Rail 34 such that when the Middle Web Bracket 16 is mounted on the Frame Rail 12 (see discussion below) there is gap between surface of the Frame Rail and the Plate 32. As the name implies, a Wash Out Gap 42 improves washability. For a Frame Rail 12 that has a square cross-section, the Perimeter Defining An Opening For A Frame Rail 34 is most preferably shaped to have an alternating configuration of four orthogonal Relief Welds 46 and four orthogonal Wash Out Gaps 42.

Referring to FIG. 3. and FIG. 6, optionally, a Middle Web Bracket 16 has one or more Perimeter(s) Defining An Opening For Attachment Of An Accessory 48 (see discussion below on accessories.) A Perimeter Defining An Opening For Attachment Of An Accessory 48 is an aperture provided through the Plate 32 to receive a fastener, an interconnecting bracket or both for attaching an accessory.

Referring to FIG. 4 and FIG. 5, optionally there is a Stiffener Bend 36 in the Plate 32. This Stiffener Bend 36 demarcates a flange or lip 38. As the name implies, the Stiffener Bend 36 strengthens the Middle Web Bracket 16 against bending in a direction transverse to the Stiffener Bend 36. Typically, the Stiffener Bend 36 is at the inferior portion of the Plate 32 when viewed from the perspective of the Middle Web Bracket 16 in an assembled OFCCS 10 (see discussion herein.) Referring to FIG. 5, the Stiffener Bend 36 is at an acute angle. While a right angle might appear to add the greatest amount of mechanical strength, typically it is not used because, a right angle can result in water accumulation. Most preferably, the Stiffener Bend 36 is about twenty degrees.

Referring to FIG. 2, an End Web Bracket 14 is substantially the same as Middle Web Bracket 16; except, it does not have a Perimeter Defining An Opening For Receiving A Frame Rail 34. Preferably, the End Web Bracket 14 has one or more small apertures within the Interior Area to receive a penetrating fastener for attaching a Frame Rail 12.

Figure 7:
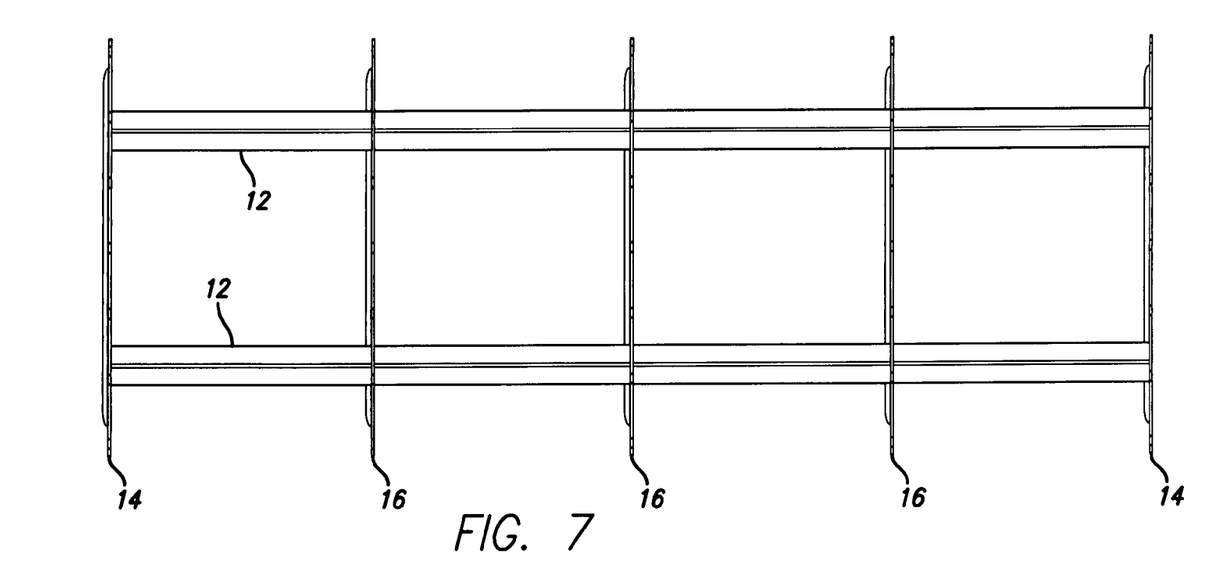
FIG. 7 is a top plan view illustrating a plurality of Web Brackets in combination with two Frame Rails.
Figure 8:
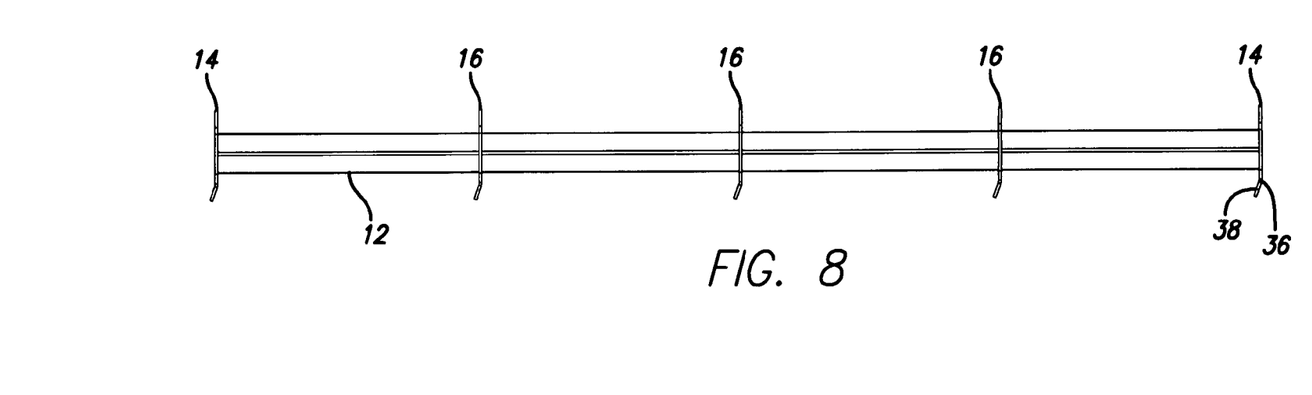
FIG. 8 is a side plan view illustrating a plurality of Web Brackets in combination with a Frame Rail.

Referring to FIG. 7 and FIG. 8, in an assembled OFCCS 10 a Middle Web Bracket 16 is mounted on a Frame Rail 12 through a Perimeter Defining An Opening For Receiving A Frame Rail 34. The Middle Web Bracket 16 is secured by welding to a Frame Rail 12. Typically, there is a succession of a plurality of Middle Web Brackets 16 mounted in spaced apart fashion along a Frame Rail 12. A preferred spacing for the Middle Web Brackets 16 along the Frame Rail 12 is twelve inches or eighteen inches apart. Further, in a preferred embodiment, there is a plurality of side-by-side Frame Rails 12 running in parallel and the Middle Web Brackets 16 are mounted onto this plurality of Frame Rails 12 with each Web Bracket having an appropriate number of Perimeters Defining An Opening For Receiving A Frame Rail 34. A preferred number of Frame Rails 12 is two.

Continuing to refer to FIG. 7 and FIG. 8, in a preferred assembled OFCCS 10 there End Web Brackets 14 mounted on the ends a Frame Rail 12. The End Web Bracket 14 is secured by penetrating fasteners or welding to the Frame Rail 12. One possible configuration for an assembled OFCCS 10 is to have two End Web Brackets 14 and no Middle Web Brackets 16; however, this is not preferred.

Referring to FIG. 1 and FIG. 9, in an assembled OFCCS 10, there are two operative orientations for a Skid Rail having a rectangular cross-section. In one operative orientation, the long side 30 of the rectangular cross-section is horizontal and the short side 28 is vertical (not illustrated.) Accordingly, the conveyor belt slides on the long side 30 of the Skid Rail 12. This is referred to as "Lying On Flat." This is the operative orientation which is used in prior art open frame conveyor system. In the other operative orientation, the short side 28 is horizontal and the long side 30 is lateral (illustrated here.) Accordingly, the conveyor belt slides on the short side 28 of the Skid Rail. This is referred to as "Lying On Edge."

Utilization of Lying on Edge is a preferred orientation for insertion over Lying on Flat. A Skid Rail 18 Lying On Flat is subject to more bending and bowing compared to a Skid Rail 18 Lying On Edge. This is because Lying On Flat involves the short side 28 being vertical and Lying On Edge involves the long side 30 being vertical. The longer the vertical side, the greater the mechanical resistance to bending and bowing. A Skid Rail 18 Lying On Flat wears out sooner compared to the Skid Rail 18 Lying On Edge. Again, this is because Lying On Flat involves the short side 28 being vertical and Lying On Edge involves the long side 30 being vertical. The longer the lateral side, the more material there is to abrade away and hence a longer useful life of the Skid Rail 18.

Figure 10:
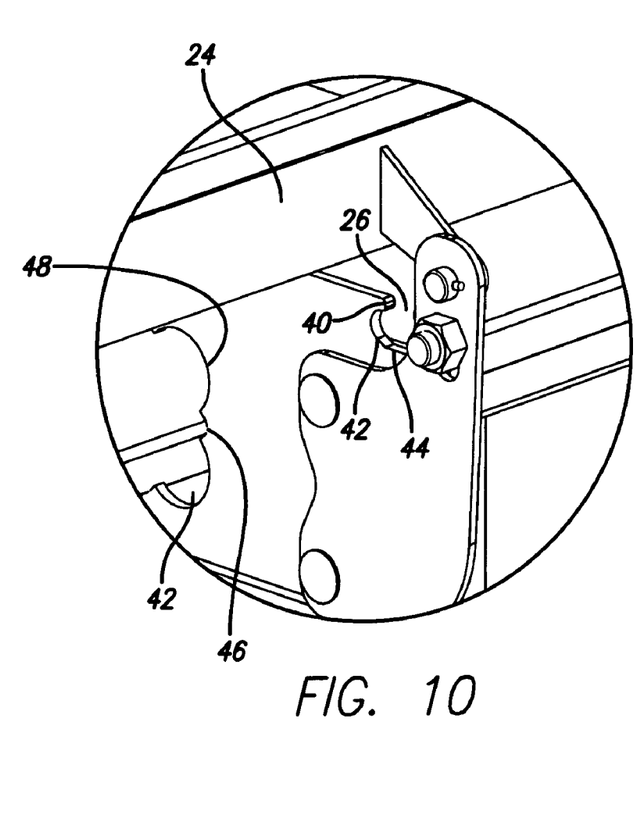

Referring to FIG. 1 and FIG. 10, optionally, there is attached to the Web Brackets 14, 16 one or more accessories. An accessory is a thing to enhance the functionality or utility of the OFCCS 10, as discussed above. By way of example, and not by way of limitation, accessories include motors, switch boxes, drive rollers, idler rollers, support legs and guide rails. For example, turning to FIG. 10, an upper guide rail and upper guide rail support is mounted to a Middle Web Bracket 16.

Referring to FIG. 1, a Drive Which Is In Mechanical Connection To The Conveyor Belt Which Locomotes The Conveyor Belt Along The Skid Rail 20 (a Drive) is known to persons of skill in the art. An example of a Drive 20 is a combination of a motor, one or more drive rollers with sprockets, a drive chain interconnecting the motor and the drive roller(s), (not illustrated) and one or more idler rollers. The endless conveyor belt (not illustrated) has cavities to receive sprockets on the drive roller.

The previously described versions of the present invention have many advantages. One advantage of the present invention is that Skid Rails can be securely mounted to Web Brackets with no fasteners, such as, for example, nuts and bolts. This allows for it easier disassembly and assembly during routine cleaning. It alleviates the is a need for tools for disassembly of Skid Rails for a COP cleaning. This also reduces or eliminates heat deflection of Skid Rails during CIP.

Another advantage of the present invention is that the lap seam between the Skid Rail on Edge and the Skid Rail Base of a Side Grip Slot is a much reduced area compared to the lap seam between a Skid Rail and a Skid Rail Tab. This reduces or eliminates the buildup of debris in the lap seam and facilitates a more sanitary operation and an easier routine cleaning. Likewise, since there are no penetrating fasteners to attach Skid Rails to Skid Rail Tabs, there are no interstitial spaces about these fasteners to collect debris. Accordingly, this further reduces or eliminates the buildup of debris during operation for a more sanitary operation and facilitates an easier routine cleaning.

Another advantage of the present invention is the utilization of an edge orientation of Skid Rails such that the Skid Rails have enhanced mechanical strength compared to that in current OFCCS. The on edge orientation also provides the advantage of a longer wear life for the Skid Rails that compared to that in current OFCCS.

Another advantage of the present invention is Web Brackets that have enhanced mechanical strength through a Stiffener Bend.

EXAMPLES

The following examples further describe and demonstrate embodiments within the scope of the present invention. The examples are given solely for the purpose of illustration and are not to be construed as limitations or restrictions of the present invention, as persons skilled in the art will quickly realize many variations thereof are possible that are all within the spirit and scope of the invention.

Example 1

This Example is a parts list for an open frame conveyor system according to the present invention and illustrated in FIG. 1:

| Quantity | Description |
| --- | --- |
| One | Weldment, legs, mainframe |
| One | Weldment, mainframe |
| One a/b | Bracket, return roller |
| Four | Caster, swivel locking |
| Eight | Nut, hex jam stainless steel ¾ - 10 |
| Six | Roller, beveled edge - three inch roller |
| Eighteen | Roller, Idler - 3 inch outside diameter by one inch inside diameter by 0.4338 LG |
| Five | Shaft, idler, 1.00 in. diameter by 28 in. belt |
| Forty | Spacer, stainless steel |
| Twenty | Bolt, carriage, stainless steel ⅜ - 16 by 2 inches |
| 44 | Washer, ANSI plate stainless steel ⅜ |
| 44 | Nut, locking nylon insert, hex stainless steel ⅜ - 16 |
| 24 | Bolt, carriage, stainless steel 3/16 - 16 by 1½ |
| Seven | Sprocket, habasit, habaguard acetal, 5.9 in. PD |
| One | Shaft, drive, 1.50 in. square by 28 in. belt |
| Four | Ring, retaining 1.50 in. square shaft |
| One | Bearing, four bolt flange |
| Two | Bolt, hex stainless steel 5/16 - 18 by 1¼ |
| Four | Washer, locking split stainless steel ⅜ |
| Eight | Roller, Beveled e - 2 inch roller |
| 24 | Roller, Idler - 2 in. outside diameter by 1 in. inside diameter by 4.438 in. LG |
| One | Weldment, meeting bracket, motor and bearing |
| One | Weldment, out-feed |
| One | Weldment, in-feed |
| Two | Nosebar, ultra-clean |
| Seven | Strip ultra high molecular weight plastic cut to - ⅝ in. by 1¼ in. by 80 3/16 in. |
| Six | Bracket, pivot guide |
| One a/b | Weldments, product guide |
| Six | Pin, stop guide hinge |
| Six | Nut, locking, nylon insert hex stainless steel ½ - 13 |
| Six | Pin Guides |
| Six | Pin dowel, stainless steel |
| One | Reducer, hollow shaft, stainless steel and |
| One | Motor, Bost-Kleen washdown duty |
| 21 feet | Belt, Habasit M1220, 27.56 inches wide wide flat top |
| Two | Bolt, hex stainless steel 5/16 - 18 by ¾ |
| One | Bracket, Reducer |
| 4.3 Feet | Rod, all thread stainless steel ¾ - 10 |
| One | Motor, half hoarse power, 208–230/460 volts/three phase |

Example 2

Example two is an assembly of 2 frame rails, three middle web brackets and 2 end web brackets as depicted in FIG. 2. The frame rails are 2 in. square by 11 gauge by 12.02 feet in length. The frame rails and brackets are electro-polished after welding.

Example 3

Example three is a middle web bracket as depicted in FIG. 3. The material is 7 gauge stainless steel and a 10% bend thickness is added. The length of the superior edge of the web bracket is 14.56 in.; the overall height is 6.23 in. and flange defined by the stiffener bend 1.11 in height. The stiffener bend is at a 20° angle. The bracket is for a 14 in. belt.

Example 4

Example four is a middle bracket as depicted in FIG. 5. The material is 7 gauge stainless steel and a 10% bend thickness is added. The overall height is 6.20 inches and stiffener bend is at 20 degrees.

Example 5

Examples six is a middle web bracket. The length of the superior edge of the bracket is 28 9/16 in. The perimeter defining an opening for the frame rail has a spacing between oppositely opposed relief welds of 2 15/16 in. The bracket is intended for use with a frame rail that is a tube that is a 2 square by 11 gauge.

Example 6

Example six is an assembly of two frame rails, two end web brackets three middle web brackets as depicted in FIG. 7. The overall length from the outside edge of one end web bracket to the other is 72 and a half inches.

Example 7

Example seven is an assembly of two frame rails, two end web brackets three middle web brackets as depicted in FIG. 7. The frame rail length is 72¼. Moving from left to right, the first middle web bracket is space 18¼ inches from the end web bracket on the far left, the second middle web bracket is spaced 18 inches from the first middle web bracket; the third middle web bracket is based 18 1/16 in. from the second middle web bracket and the web bracket at the far right is spaced 18 inches from the third middle web bracket.

Although the present invention has been described in considerable detail with reference to certain preferred versions thereof, other versions are possible with substituted, varied and/or modified materials and steps are employed. These other versions do not depart from the invention. Therefore, the spirit and scope of the appended claims should not be limited to the description of the preferred versions contained herein.

What is claimed is:

1. An end web bracket for use in an open frame continuous conveyor system comprised of:
   a. a plate having an interior area and a peripheral edge and
   b. a side grip slot defining an opening within the interior area that extends from the peripheral edge which is shaped to have a pair of oppositely opposed skid rail grip tips, a wash out gap and a skid rail base and is adapted to frictionally fit a skid rail.

2. The end web bracket of claim 1 where side grip slot is adopted to frictionally fit a skid rail lying on edge.

3. The end web bracket of claim 1 where there is an aperture within the interior area to receive a penetrating fastener for attaching a frame rail.

4. The end web bracket of claim 1 where the skid rail grip tips have a rounded configuration.

5. The end web bracket of claim 1 where the side grip slot is shaped to have a pair oppositely opposed wash out gaps.

6. The end web bracket of claim 1 where the plate has a stiffener bend.

7. The end web bracket of claim 1 having a perimeter defining an opening for attachment of an accessory.

8. A middle web bracket for use in an open frame continuous conveyor system comprised of:
   a. a plate having an interior area and a peripheral edge;
   b. a side grip slot defining an opening within the interior area that extends from the peripheral edge which is shaped to have a pair of oppositely opposed skid rail grip tips, a wash out gap and a skid rail base and is adapted to friction fit a skid rail and
c. a perimeter defining an opening for receiving a frame rail within the interior area.

9. The middle web bracket of claim 8 where said side grip slot is adopted to frictionally fit a skid rail lying on edge.

10. The middle web bracket of claim 8 where the skid rail grip tips have a rounded configuration.

11. The middle web bracket of claim 8 where the side grip slot is shaped to have a pair of oppositely opposed wash out gaps.

12. The middle web bracket of claim 8 where the plate has a stiffener bend.

13. The middle web bracket of claim 8 having a perimeter defining an opening for attachment of an accessory.

14. The middle web bracket of claim 8 where the perimeter defining an opening for receiving a frame rail is shaped to have a relief weld and a wash out gap.

15. An open frame continuous conveyor system comprised of
a. frame rail having an interior length and ends;
b. a plurality of middle web brackets of claim 8 mounted along the interior length of the frame rail in spaced apart relation;
c. skid rail mounted lying on edge is in the side grip slots of web brackets;
d. a continuous conveyor belt running parallel over the skid rail;
e. a drive which is in mechanical connection to the conveyor belt which locomotes the conveyor belt along the skid rail.

16. The continuous conveyor system of claim 15 where there is an end web bracket of claim 1 mounted at an end of the frame rail.

17. A middle web bracket for use in an open frame continuous conveyor system comprised of:
a. a plate having an interior area and a peripheral edge;
b. a side grip slot defining an opening within the interior area that extends from the peripheral edge which is shaped to have a pair of oppositely opposed skid rail grip tips in a rounded configuration, a pair of oppositely opposed wash out gaps and a skid rail base and is adapted to friction fit a skid rail lying on edge and
c. a perimeter defining an opening for receiving a frame rail within the interior area which is shaped to have a relief weld and a wash out gap.

18. The middle web bracket of claim 17 where the plate has a stiffener bend.

19. The middle web bracket of claim 17 having a perimeter defining an opening for attachment of an accessory.

20. An open frame continuous conveyor system comprised of
a. frame rail having an interior length and ends;
b. a plurality of middle web brackets of claim 17 mounted along the interior length of the frame rail in spaced apart relation;
c. a skid rail mounted lying on edge is in the side grip slots of web brackets;
d. a continuous conveyor belt running parallel over the skid rail;
e. a drive which is in mechanical connection to the conveyor belt which locomotes the conveyor belt along the skid rail.

21. (The continuous conveyor system of claim 20 where there is an end web bracket of claim 2 mounted at an end of the frame rail.

\* \* \* \* \*